(12) United States Patent
Ryu et al.

(10) Patent No.: US 11,242,823 B1
(45) Date of Patent: Feb. 8, 2022

(54) FUEL TANK ISOLATION SOLENOID VALVE FOR VEHICLE

(71) Applicants: HYUNDAI MOTOR COMPANY, Seoul (KR); KIA MOTORS CORPORATION, Seoul (KR)

(72) Inventors: Bu Yeol Ryu, Hwaseong-si (KR); Tae Koon Kim, Seoul (KR); Hyun Do Jeon, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 17/100,126

(22) Filed: Nov. 20, 2020

(30) Foreign Application Priority Data

Aug. 4, 2020  (KR) .................. 10-2020-0097486

(51) Int. Cl.
| | |
|---|---|
| *F02M 25/00* | (2006.01) |
| *F02M 25/08* | (2006.01) |
| *F16K 31/06* | (2006.01) |

(52) U.S. Cl.
CPC ..... *F02M 25/0836* (2013.01); *F16K 31/0655* (2013.01); *F02M 2025/0845* (2013.01)

(58) Field of Classification Search
CPC .......... F02M 25/0836; F02M 25/0854; F02M 2025/0845; F16K 31/0655; F16K 11/161
See application file for complete search history.

(56) References Cited

U.S. PATENT DOCUMENTS

| | | | | |
|---|---|---|---|---|
| 3,633,625 A * | 1/1972 | Rudel | ................... | F16K 11/161 137/630.22 |
| 4,318,383 A * | 3/1982 | Iritani | ............... | F02M 25/0836 123/520 |
| 5,406,975 A * | 4/1995 | Nakamichi | ......... | F16K 31/0655 137/495 |
| 5,467,749 A * | 11/1995 | Meiwes | ................... | F02M 3/07 123/339.27 |
| 7,107,971 B2 * | 9/2006 | Spink | ............... | B60K 15/03519 123/518 |
| 8,925,522 B2 * | 1/2015 | Landenberger | ...... | F02M 59/366 123/458 |
| 9,500,291 B2 | 11/2016 | Pifer et al. | | |
| 9,631,583 B2 | 4/2017 | Balsdon et al. | | |
| 9,816,450 B2 * | 11/2017 | Akita | ............... | B60K 15/03504 |
| 9,890,747 B2 * | 2/2018 | Williams | ............ | F16K 31/0655 |
| 2010/0269921 A1 * | 10/2010 | Pifer | ................... | F16K 17/0413 137/487.5 |

(Continued)

FOREIGN PATENT DOCUMENTS

| | | |
|---|---|---|
| JP | 2530993 B | 9/1996 |
| JP | 2000-510217 A | 8/2000 |

(Continued)

*Primary Examiner* — Phutthiwat Wongwian
*Assistant Examiner* — Sherman D Manley
(74) *Attorney, Agent, or Firm* — Lempia Summerfield Katz LLC

(57) ABSTRACT

A fuel tank isolation solenoid valve for a vehicle includes: a plunger disposed in the isolation solenoid valve to be vertically moved and has first vent holes for releasing overpressure or over-negative pressure; a valve body disposed in the isolation solenoid valve to be vertically moved and has second vent holes for releasing overpressure or over-negative pressure.

11 Claims, 10 Drawing Sheets

(56) References Cited

U.S. PATENT DOCUMENTS

| | | | |
|---|---|---|---|
| 2012/0288389 A1* | 11/2012 | Kuroyanagi | F16K 1/54 417/559 |
| 2015/0144819 A1* | 5/2015 | Pifer | F16K 17/0413 251/129.15 |
| 2016/0369714 A1* | 12/2016 | Burleigh | F02M 25/0854 |
| 2017/0036531 A1* | 2/2017 | McLauchlan | B60K 15/03504 |
| 2019/0084410 A1* | 3/2019 | Bhandari | B60K 15/03519 |
| 2021/0033212 A1* | 2/2021 | Kurz | F16K 1/443 |
| 2021/0148484 A1* | 5/2021 | Gruenberger | F16K 1/42 |

FOREIGN PATENT DOCUMENTS

| | | |
|---|---|---|
| JP | 2017-057724 A | 3/2017 |
| KR | 10-1181065 B | 9/2012 |
| KR | 10-1197453 B | 11/2012 |
| KR | 10-1302414 B | 9/2013 |

\* cited by examiner

[ UPON APPLICATION OF POWER ]

[ OPERATION OF RELEASING OVERPRESSURE ]

[ OPERATION OF RELEASING OVER-NEGATIVE PRESSURE ]

FUEL TANK ISOLATION SOLENOID VALVE FOR VEHICLE

CROSS-REFERENCE TO RELATED APPLICATION

This application claims priority to and the benefit of Korean Patent Application No. 10-2020-0097486, filed on Aug. 4, 2020, the entire contents of which are incorporated herein by reference.

FIELD

The present disclosure relates to a fuel tank isolation solenoid valve for a vehicle in which a positive and negative pressure relief valve is integrally incorporated.

BACKGROUND

The statements in this section merely provide background information related to the present disclosure and may not constitute prior art.

Referring to FIG. 1, a fuel tank 10 for a vehicle is connected to a canister 20, which is configured to collect evaporation gas of fuel and to purge the evaporation gas to the combustion chamber in an engine 30 such that the evaporation gas is burned in the combustion chamber.

To this end, the inlet 21 of the canister 20 and the fuel tank 10 are connected to each other via a discharge line 13 disposed therebetween, and the outlet 22 of the canister 20 and an engine intake duct are connected to each other via a purge line 14 disposed therebetween.

The canister 20 is provided therein with a collector (not shown), configured to adsorb and collect evaporation gas, and is provided with a discharge port 23 through which the remaining purified air excluding the evaporation gas collected at the collector is discharged to the outside.

Consequently, the fuel in the fuel tank 10 is supplied to the engine 30 through a fuel supply line 12 so as to be burned by operation of a fuel pump 11 mounted in the fuel tank 10, and the evaporation gas from the fuel in the fuel tank 10 is collected in the canister 20 through the discharge line 13, and is supplied to the engine 30 through the purge line 14 so as to be burned due to the negative intake pressure of the engine.

Hybrid vehicles, particularly plug-in hybrid electric vehicles (PHEVs) travel in an EV traveling mode using a drive motor. However, when evaporated gas is maximally collected in the canister 20, the collection of the evaporation gas which is continuously introduced from the fuel tank 10 is limited.

Although the evaporation gas collected in the canister 20 is purged to the engine so as to be burned when the hybrid vehicle is converted into an HEV traveling mode in which the engine is operated, the evaporation gas is continuously introduced from the fuel tank 10 beyond the collection capacity of the canister 20 in a parked or stopped state or an EV traveling mode.

Accordingly, when the evaporation gas is continuously introduced into the canister 20 from the fuel tank 10 in the state in which the evaporation gas is maximally collected in the canister 20, the evaporation gas exceeding the collection capacity of the canister 20 is not collected in the canister, but is discharged to the atmosphere through the discharge port 23, thereby causing a problem of air pollution.

A fuel tank isolation solenoid valve (FTIV) 200 is mounted on the discharge line 13 connected both to the fuel tank 10 and to the inlet 21 of the canister 20 such that isolation solenoid valve 200 is closed or opened so as to block or permit flow of the evaporation gas to the canister 20 from the fuel tank 10, as illustrated in FIG. 2.

The isolation solenoid valve 200, which is a solenoid-type isolation solenoid valve configured to be opened upon application of power, is normally maintained in the closed state but is opened only when the engine is operated or the fuel tank is refueled.

More specifically, the isolation solenoid valve 200 is maintained in the closed state in a normal situation, in which the engine is not operated, as in a parked or stopped state or an EV traveling mode. However, the isolation solenoid valve 200 is opened by application of power in response to a signal from a controller (for example, an engine control unit; ECU) upon operation of the engine or by application of power in response to a signal from a controller (for example, a body control unit; BCM) upon refueling.

Consequently, when the isolation solenoid valve 200 is maintained in the closed state, the evaporation gas in the fuel tank 10 is hermetically stored in the fuel tank 10 without flowing into the canister 20, thereby inhibiting the evaporation gas from being discharged to the atmosphere through the canister 20.

Meanwhile, when the isolation solenoid valve 200 is opened upon operation of the engine, the evaporation gas in the fuel tank 10 is collected in the canister 20 through the opened isolation solenoid valve 200, and the evaporated gas collected in the canister 20 is purged to the engine so as to be burned due to the negative intake pressure of the engine.

In addition, when the isolation solenoid valve 200 is opened upon refueling of the fuel tank, the evaporation gas in the fuel tank 10 is collected in the canister 20 through the opened isolation solenoid valve 200, and the internal pressure in the fuel tank 10 is released, thereby allowing the fuel tank to be easily refueled.

At this time, when a refueling button in the vehicle is pushed by a user, the controller (for example, the body control unit; BCM) performs control to check whether the isolation solenoid valve 200 is opened for release of the internal pressure in the fuel tank and to open an electrical fuel door 40.

As illustrated in FIG. 3, the isolation solenoid valve 200 is further provided at one side thereof with a positive and negative pressure relief valve 210, which is a kind of safety valve.

The relief valve 210 is normally maintained in the closed state. However, when overpressure (positive pressure), which is higher than a reference pressure, acts on the isolation solenoid valve 200 from the fuel tank 10, the relief valve 210 operates to open the bypass path provided therein toward the canister 20 so as to release the overpressure. Furthermore, when over-negative pressure, which is lower than the reference pressure, acts to the isolation solenoid valve 200 from the canister 20, the relief valve 210 operates to cause the bypass path to be opened toward the fuel tank 10 so as to release the over-negative pressure.

However, we have discovered that because the conventional isolation solenoid valve is further provided with the relief valve, the conventional isolation solenoid valve has the following disadvantages.

First, because the relief valve is provided at one side of the isolation solenoid valve so as to project laterally, the overall size of the isolation solenoid valve is increased and package layout to mount the isolation solenoid valve including the relief valve to a vehicle body is desired.

Second, because the relief valve is additionally mounted on the isolation solenoid valve, the number of components and manufacturing costs increase.

The above information disclosed in this Background section is only for enhancement of understanding of the background of the present disclosure and therefore it may contain information that does not form the prior art that is already known to a person of ordinary skill in the art.

SUMMARY

The present disclosure provides a fuel tank isolation solenoid valve for a vehicle. The fuel tank isolation solenoid valve includes: an upper case, a bobbin mounted in the upper case, around which a coil is wound, a core mounted in the bobbin, the core having a plunger passage which is open at a lower end thereof, a lower case coupled to the upper case, the lower case including a first passage communicating with a fuel tank, a second passage communicating with a canister, and a communication passage defined between the first passage and the second passage, a plunger having formed therein a lower open space and a plurality of first vent holes, configured to allow the first passage to communicate with the lower open space, the plunger being disposed in the plunger passage to be vertically movable, a main seal mounted on a lower surface of the plunger, a valve body disposed in the communication passage to be vertically movable, the valve body having therein a plurality of second vent holes, which are vertically formed through the valve body so as to allow the first passage to communicate with the second passage, a sealing plate mounted on the lower case at an outer circumference of the communication passage so as to be in airtight contact both with a lower surface of the main seal and with an upper surface of the valve body, a first spring disposed between a lower surface of the core and a lower end of the plunger, and a second spring disposed between a lower surface of the valve body and a bottom surface of the communication passage.

A diaphragm may be disposed between an outer surface of the plunger and an inner surface of the core, and may be connected thereto so as to inhibit foreign substances from entering the valve.

The plunger may further have a vent hole formed therein to allow an upper space in the diaphragm to communicate with the lower open space in the plunger.

The plunger may have a first spring-holding groove formed in an outer circumference of a lower end thereof, the first spring being fitted and held in the first spring-holding groove.

The plunger may be provided on an upper surface thereof with a stopper, which comes into contact with an upper end surface of the plunger passage formed in the core while buffering the upper end surface.

The valve body may include a sealing wall projecting from an upper surface thereof at an inner circumference inwardly spaced apart from the second vent holes, the sealing wall coming into airtight contact with the main seal.

The valve body may include a vertical guide pin formed at a center of the upper surface thereof, the vertical guide pin entering and coming out of the lower open space in the plunger.

The valve body may have a second spring-holding groove formed in an outer circumference of the lower surface thereof, the second spring being fitted and held in the second spring-holding groove.

The sealing plate may include a fitting wall formed on a lower surface thereof, and the lower case may have a fitting groove formed in an outer circumference of the communication passage, the fitting wall being fitted and held in the fitting groove.

When overpressure, which is a pressure higher than a reference pressure, acts on the valve body through the first passage and the first vent holes in the plunger from the fuel tank, the valve body may be lowered while compressing the second spring, and the overpressure may sequentially pass through the first vent holes and the lower open space in the plunger and the second vent holes in the valve body and may act on the second passage, whereby the overpressure is released.

When over-negative pressure, which is lower than a reference pressure, acts on a lower portion of the plunger through the second vent holes in the valve body from the canister, the plunger may be raised while compressing the first spring, and the over-negative pressure may pass through the second vent holes in the valve body and may act on the first passage communicating with the fuel tank, whereby the over-negative pressure is released.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

Hereinafter, reference will now be made in detail to various forms of the present disclosure, examples of which are illustrated in the accompanying drawings and described below. While the present disclosure will be described in conjunction with exemplary forms, it will be understood that the present description is not intended to limit the present disclosure to those exemplary forms. On the contrary, the present disclosure is intended to cover not only the exemplary forms, but also various alternatives, modifications, equivalents and other forms that may be included within the spirit and scope of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

Hereinafter, a preferred form of the present disclosure will be described in detail with reference to the accompanying drawings.

Figure 4:
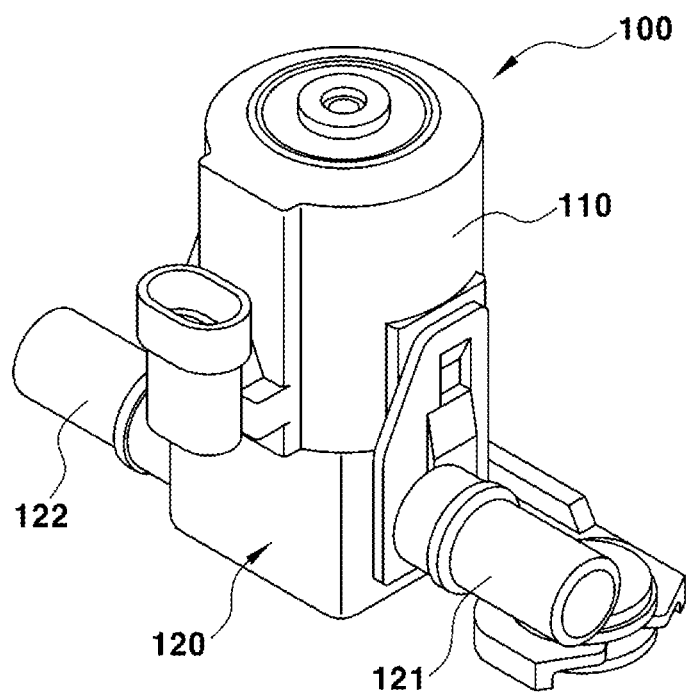
FIG. 4 is a perspective view illustrating the appearance of a fuel tank isolation solenoid valve for a vehicle according to one form of the present disclosure.
Figure 5:
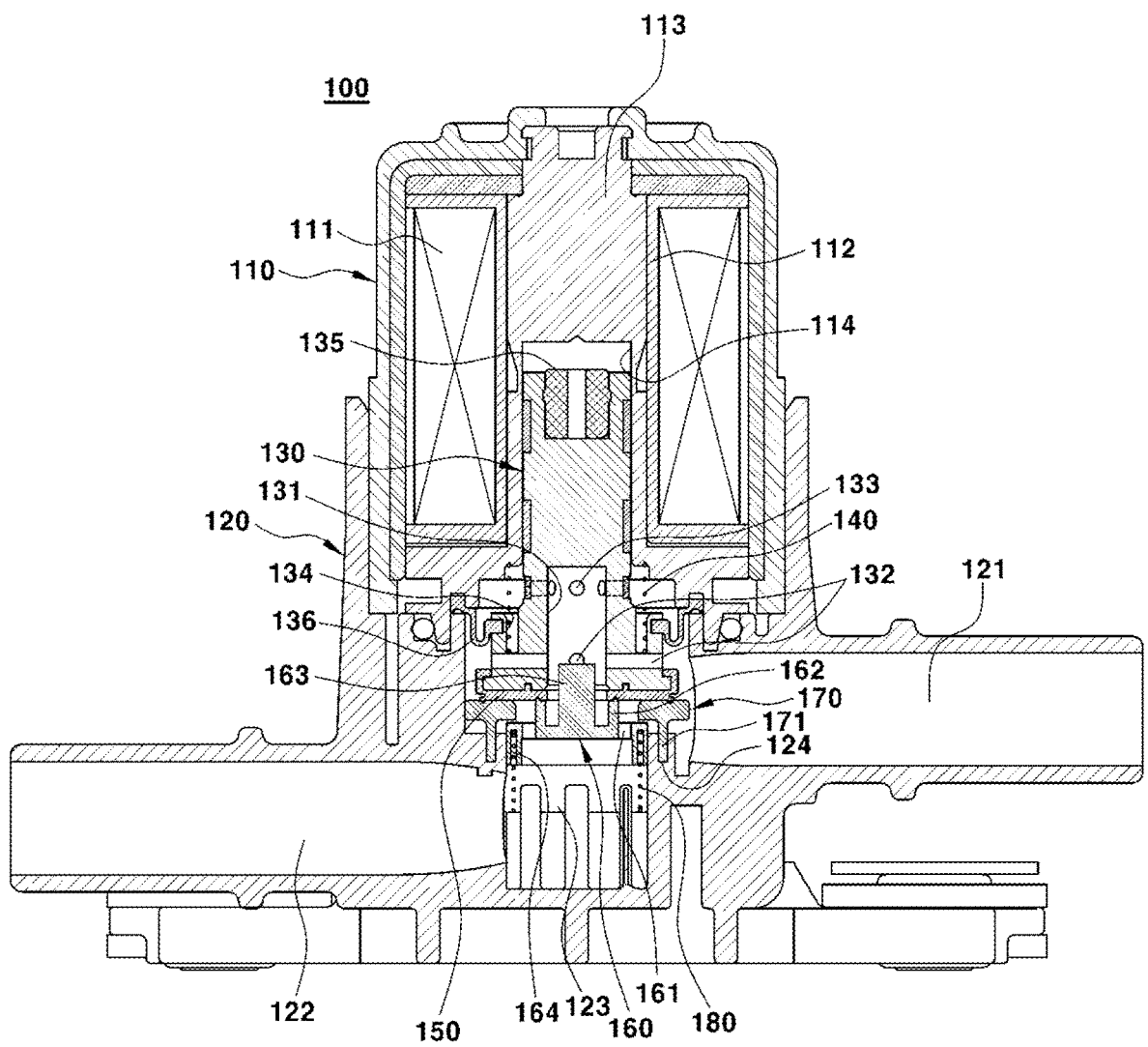
FIG. 5 is a cross-sectional view illustrating the fuel tank isolation solenoid valve for a vehicle according to one form of the present disclosure.

FIGS. 4 and 5 illustrate a fuel tank isolation solenoid valve for a vehicle according to one form of the present disclosure.

As illustrated in FIGS. 4 and 5, the fuel tank isolation solenoid valve 100 includes: an upper case 110 and a lower case 120, which are coupled to each other so as to define the appearance of the valve 100.

The lower case 120 has formed therein a first passage 121 to communicate with a fuel tank and a second passage 122 to communicate with a canister. A communication passage 123 is defined in the boundary portion between the first passage 121 and the second passage 122.

A hollow bobbin 112, around which a coil 111 is wound and which is of a solenoid type for raising and lowering the plunger, is mounted on the inner wall of the upper case 110, and a core 113 is mounted in the bobbin 112.

The core 113 is provided therein with a plunger passage 114, which is open at the lower end thereof.

A plunger 130 is disposed in the plunger passage 114 in the core 113 so as to project downwards from the core 113. Specifically, the upper end of the plunger 130 is inserted into the plunger passage 114 to be vertically movable and the lower end of the plunger 130 is positioned under the core 113.

Figure 6:
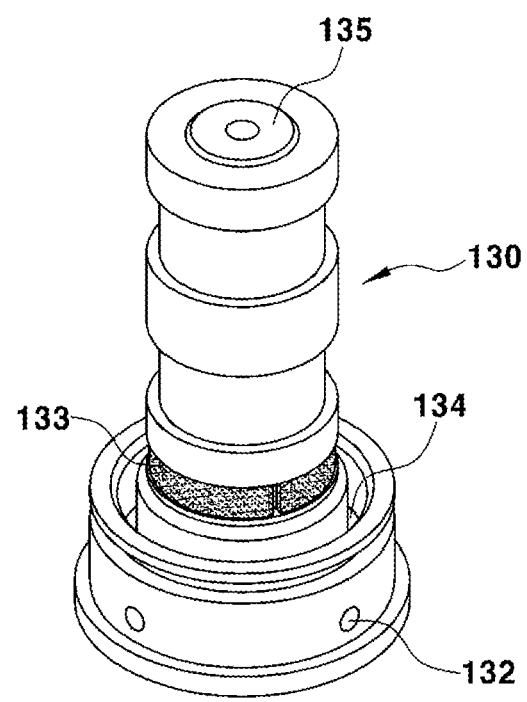
FIG. 6 is a perspective view illustrating a plunger among the components of the fuel tank isolation solenoid valve for a vehicle according to one form of the present disclosure.

As illustrated in FIGS. 5 and 6, the plunger 130 has the form of a circular column in which the diameter of the lower portion thereof is larger than the diameter of the upper portion thereof. The plunger has formed therein a lower open space 131.

Particularly, the lower portion of the plunger 130 is provided therein with a plurality of vent holes 132 for allowing the lower open space 131 to communicate with the first passage 121 in the lower case 120.

Figure 8:
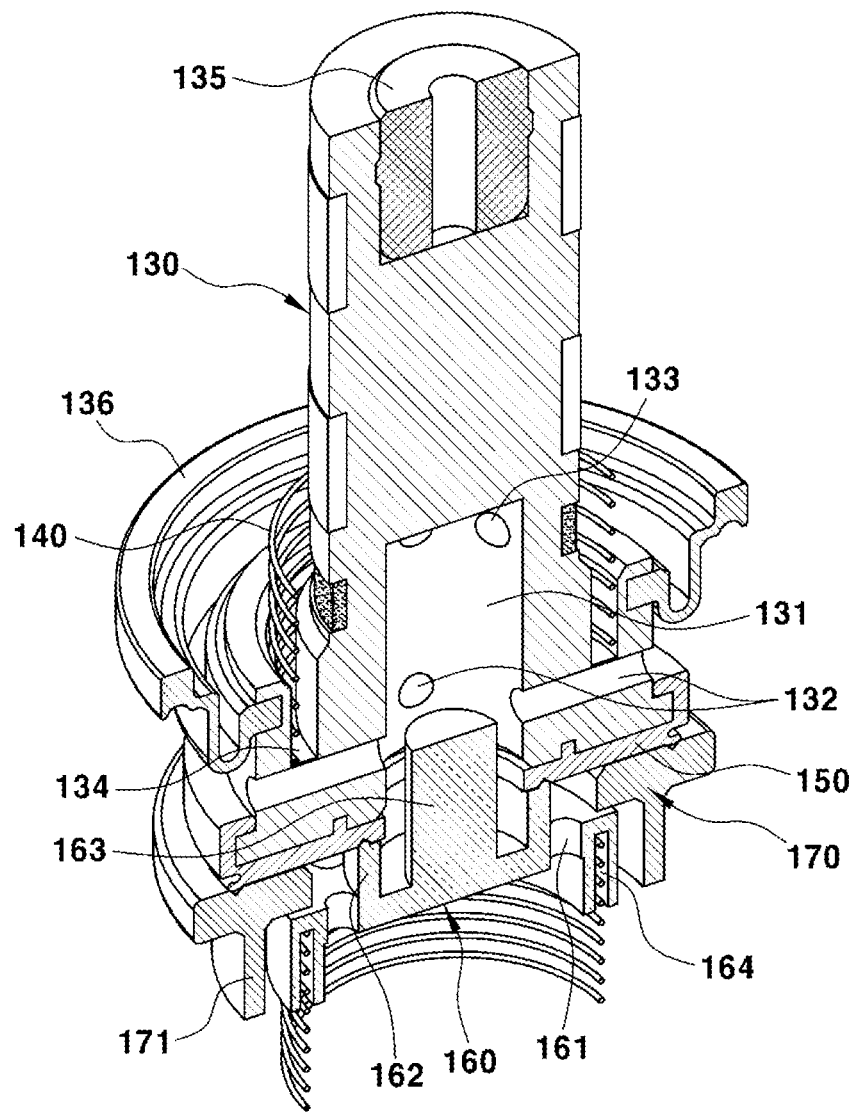
FIG. 8 is a perspective view illustrating the assembled state of the internal components of the fuel tank isolation solenoid valve for a vehicle according to one form of the present disclosure, including the plunger and the valve body.

As illustrated in FIGS. 5 and 8, a diaphragm 136 is disposed between the outer surface of the plunger 130 and the inner surface of the core 113, and is connected thereto. The diaphragm 136 serves to inhibit foreign substances from entering the plunger passage 114 in the core 113.

More specifically, the diaphragm 136 serves to inhibit a phenomenon in which the plunger 130 is jammed in the plunger passage 114 and is thus incapable of being raised and lowered due to foreign substances, which enter the plunger passage 114 in the core 113.

The plunger 130 is further provided therein with vent holes 133 for allowing the upper space in the diaphragm 136 to communicate with the lower open space 131.

Consequently, when the plunger 130 is raised, the air in the upper space in the diaphragm 136 and in the plunger passage 114 is discharged into the lower open space 131 through the vent holes 133, thereby enabling the plunger 130 to be easily raised without resistance to air.

A first spring 140 is disposed between the lower surface of the core 113 and the lower end of the plunger 130 so as to be compressed. To this end, the lower end of the plunger 130 is provided at the outer circumference thereof with a first spring-holding groove 134 in which the first spring 140 is fitted and held.

Accordingly, the first spring 140 is compressed while the plunger 130 is raised, and provides elastic restoring force to the plunger 130 when the plunger 130 is lowered.

Preferably, the plunger 130 is provided on the upper surface thereof with a rubber stopper 135, which comes into contact with the upper end surface of the plunger passage 114 formed in the core 113, thereby limiting the distance that the plunger 130 is raised and buffering the plunger 130.

A main seal 150 is mounted on the lower surface of the plunger 130. The main seal 150 is in close contact with a sealing plate 170, which will be described later, in an airtightly sealed manner, so as to block the first passage 121 communicating with the fuel tank and the second passage 122 communicating with the canister.

A valve body 160 is disposed in the communication passage 123 in the lower case 120 to be vertically movable.

Figure 7:
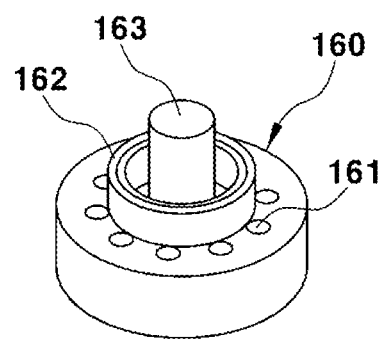
FIG. 7 is a perspective view illustrating a valve body among the components of the fuel tank isolation solenoid valve for a vehicle according to one form of the present disclosure.

Referring to FIGS. 5 and 7, the valve body 160 has formed therein a plurality of second vent holes 161 for allowing the first passage 121 to communicate with the second passage 122. The valve body 160 is disposed in the communication passage 123 to be vertically movable.

The upper surface of the valve body 160 is provided at a circumferential location inwardly spaced apart from the second vent holes 161 with a sealing wall 162, which projects upwards so as to be in airtight close contact with the lower surface of the main seal 150.

Furthermore, the center of the upper surface of the valve body 160 is provided with a vertical guide pin 163, which projects upwards and which enters and comes out of the lower open space 131 in the plunger 130.

A second spring 180 is disposed between the lower surface of the valve body 160 and the bottom surface of the communication passage 123 so as to be compressed. To this end, the lower surface of the valve body 160 is provided on the outer circumference thereof with a second-spring-holding groove 164 in which the second spring 180 is fitted and held.

The second spring 180 is compressed while the valve body 160 is lowered, and provides elastic restoring force when the valve body 160 is raised.

The lower case 120 is provided on the outer circumference of the communication passage 123 with a circular ring-shaped sealing plate 170, which is in airtight contact both with the lower surface of the main seal 150 and with the upper surface of the valve body 160.

To this end, the lower surface of the sealing plate 170 is provided with a fitting wall 171, and the lower case 120 is provided in the outer circumference of the communication passage 123 with a fitting groove 124, in which the fitting wall 171 is fitted.

Here, the sealing plate 170 is in airtight contact both with the lower surface of the main seal 150 and with the upper surface of the valve body 160, and is configured to have a circular ring shape so as to inhibit the second vent holes 161 in the valve body 160 from being blocked by the sealing plate 170, as illustrated in FIGS. 5 and 8.

The operation of the fuel tank isolation solenoid valve according to one form of the present disclosure, which is constructed in the above-described manner, will now be described.

[Closed State of the Isolation Solenoid Valve]

As illustrated in FIG. 5, the isolation solenoid valve 100 is maintained in a closed state in a normal situation in which the engine is not operated as in a parked or stopped state and an EV traveling mode.

More specifically, when the isolation solenoid valve 100 is closed, the plunger 130 is maximally raised due to the elastic restoring force of the first spring 140, and the valve body 160 is maximally raised due to the elastic restoring force of the second spring 180. Consequently, the lower surface of the main seal 150 mounted on the plunger 130 is in airtight contact with the upper surface of the sealing plate 170, and the upper surface of the valve body 160 is in airtight contact with the lower surface of the sealing plate 170.

Accordingly, since the communication passage 123, which is defined between the first passage 121 communicating with the fuel tank and the second passage 122 communicating with the canister, is closed, the evaporated gas in the fuel tank cannot flow to the canister.

When the isolation solenoid valve 100 is maintained in the closed state, the evaporated gas in the fuel tank cannot flow to the canister and is hermetically stored in the fuel tank, thereby inhibiting the evaporated gas from being discharged to the atmosphere through the canister.

[Operation of Opening the Isolation Solenoid Valve]

Figure 9:
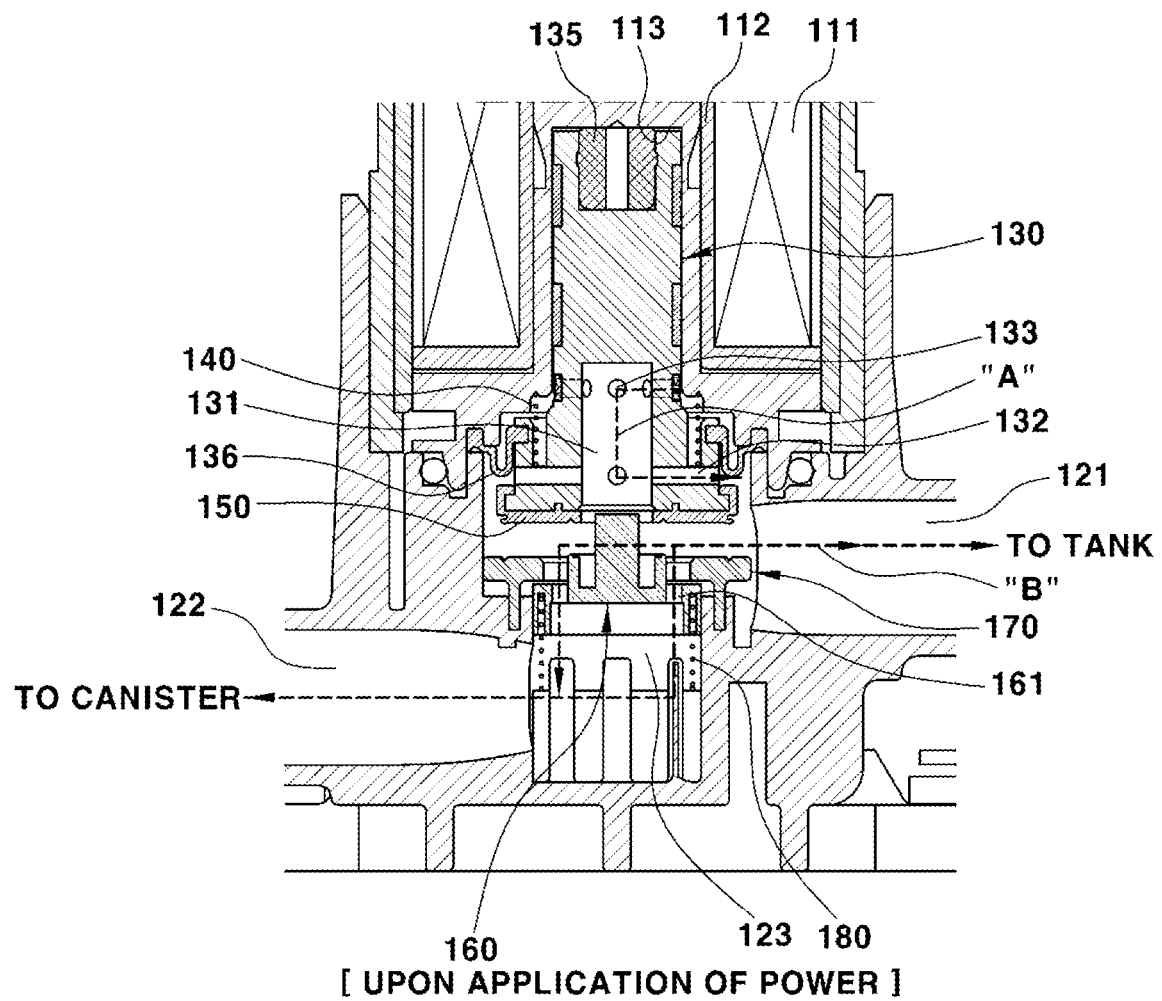
FIG. 9 is a cross-sectional view illustrating an operation of opening the fuel tank isolation solenoid valve for a vehicle according to one form of the present disclosure upon application of power.

FIG. 9 is a cross-sectional view illustrating an operation of opening the isolation solenoid valve for a vehicle according to the form of the present when power is applied thereto.

The isolation solenoid valve 100 is opened at the time of operation of the engine, refueling, checking of leakage of the fuel tank and the like.

When power is applied to the coil 111, the plunger 130 is raised along the plunger passage 114 in the core 113 due to the magnetic attraction, and the first spring 140 is compressed.

When the plunger 130 is raised, the air present in the upper space in the diaphragm 136 and the plunger passage 114 is discharged into the lower open space 131 and the first vent holes 132 through the vent holes 133, as indicated by the arrow "A" in FIG. 9, thereby allowing the plunger 130 to be easily raised without resistance to air.

Furthermore, when the plunger 130 is raised, the main seal 150 mounted on the plunger 130 is separated and spaced apart from the upper surface of the sealing plate 170.

Consequently, since the second vent holes 161 in the valve body 160 are opened, the first passage 121 communicating with the fuel tank communicates with the second passage 122 communicating with the canister via the second vent holes 161, with the result that the communication passage 123 defined between the first passage 121 communicating with the fuel tank and the second passage 122 communicating with the canister is converted into the opened state.

In other words, the first passage 121 communicating with the fuel tank and the second passage 122 communicating with the canister communicate with each other via the second vent holes 161, as indicated by the arrow "B" in FIG. 9.

When the isolation solenoid valve 100 is opened during operation of the engine, the evaporated gas in the fuel tank sequentially passes through the first passage 121, the second vent holes 161 in the valve body 160, and the second passage 122, and is collected in the canister, and the evaporated gas collected in the canister is purged to the engine so as to be burned due to the negative intake pressure of the engine.

When the isolation solenoid valve 100 is opened during refueling of the fuel tank, the evaporated gas in the fuel tank sequentially passes through the first passage 121, the second vent holes 161 in the valve body 160 and the second passage 122, and is collected in the canister. At this time, the internal pressure in the fuel tank is released, thereby allowing the fuel tank to be easily refueled.

[Operation of Isolation Solenoid Valve for Releasing Overpressure]

Figure 10:
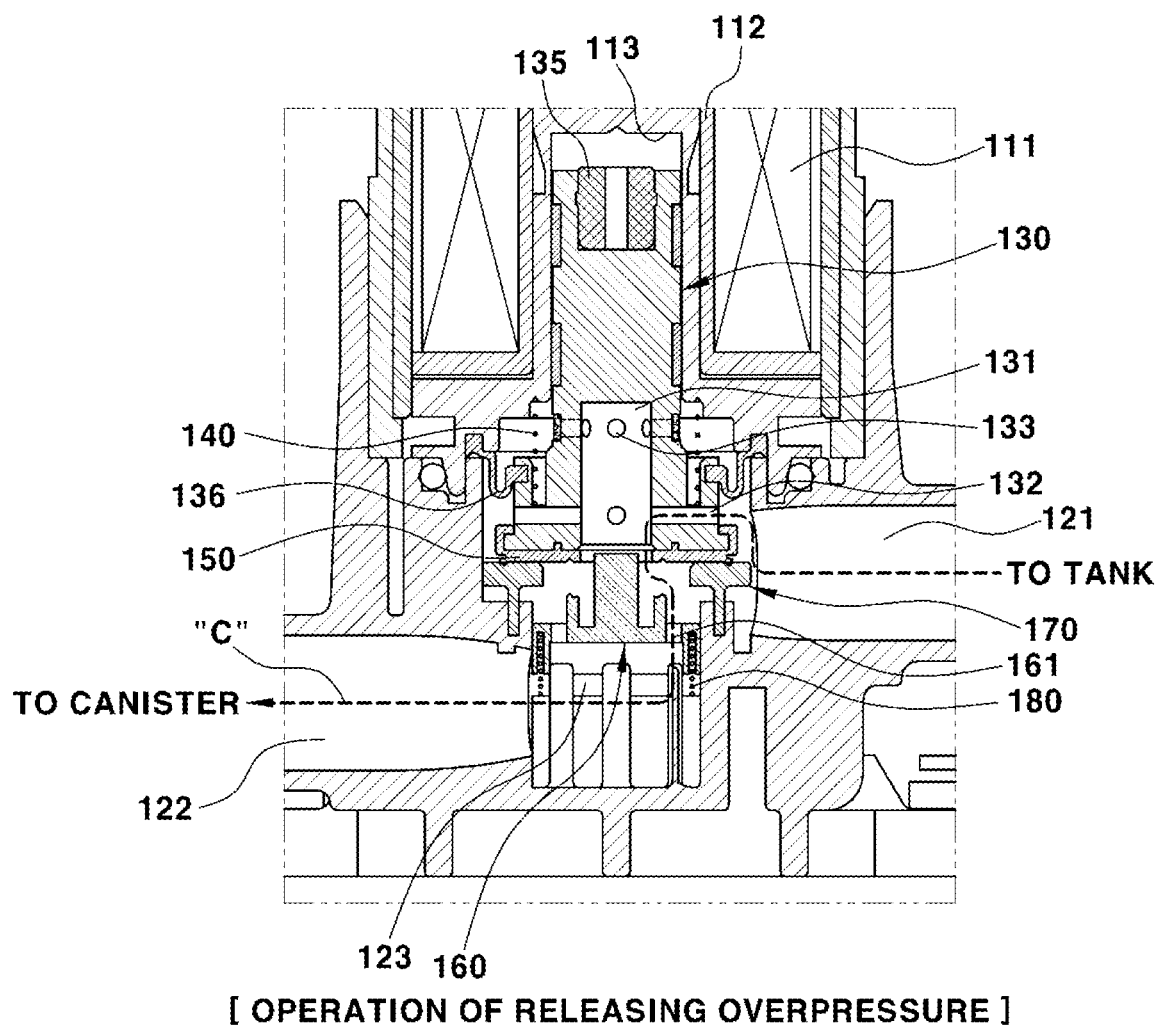
FIG. 10 is a cross-sectional view illustrating an operation of releasing overpressure by the fuel tank isolation solenoid valve for a vehicle according to one form of the present disclosure.

FIG. 10 is a cross-sectional view illustrating an operation of releasing overpressure by the fuel tank isolation solenoid valve for a vehicle according to the form of the present disclosure.

When the pressure in the fuel tank is increased to be higher than a reference pressure due to the amount of evaporated gas therein, the external temperature or the like, the overpressure in the fuel tank acts on the first passage 121.

The overpressure, which is the pressure higher than the reference pressure and which acts on the first passage 121, acts on the valve body 160 through the first vent holes 132 in the plunger 130.

Consequently, the valve body 160 is lowered while compressing the second spring 180 due to the overpressure, which is higher than the reference pressure, and the upper surface of the valve body 160 is separated and spaced apart from the lower surface of the sealing plate 170 while the sealing wall 162 of the valve body 160 is separated and spaced apart from the lower surface of the main seal 150. Consequently, the first passage 121 communicating with the fuel tank and the second passage 122 communicating with the canister communicate with each other via the second vent holes 161 in the valve body 160.

As a result, the overpressure in the fuel tank sequentially passes through the first passage 121, the first vent holes 132 in the plunger 130, the lower open space, and the second vent holes 161 in the valve body 160, and then acts on the second passage 122 communicating with the canister, whereby the overpressure is easily released, as indicated by the arrow "C" in FIG. 10.

When the overpressure is released, the valve body 160 is raised to the initial position thereof, and comes into airtight contact both with the sealing plate 170 and with the main seal 150, thereby closing the isolation solenoid valve 100.

Figure 11:
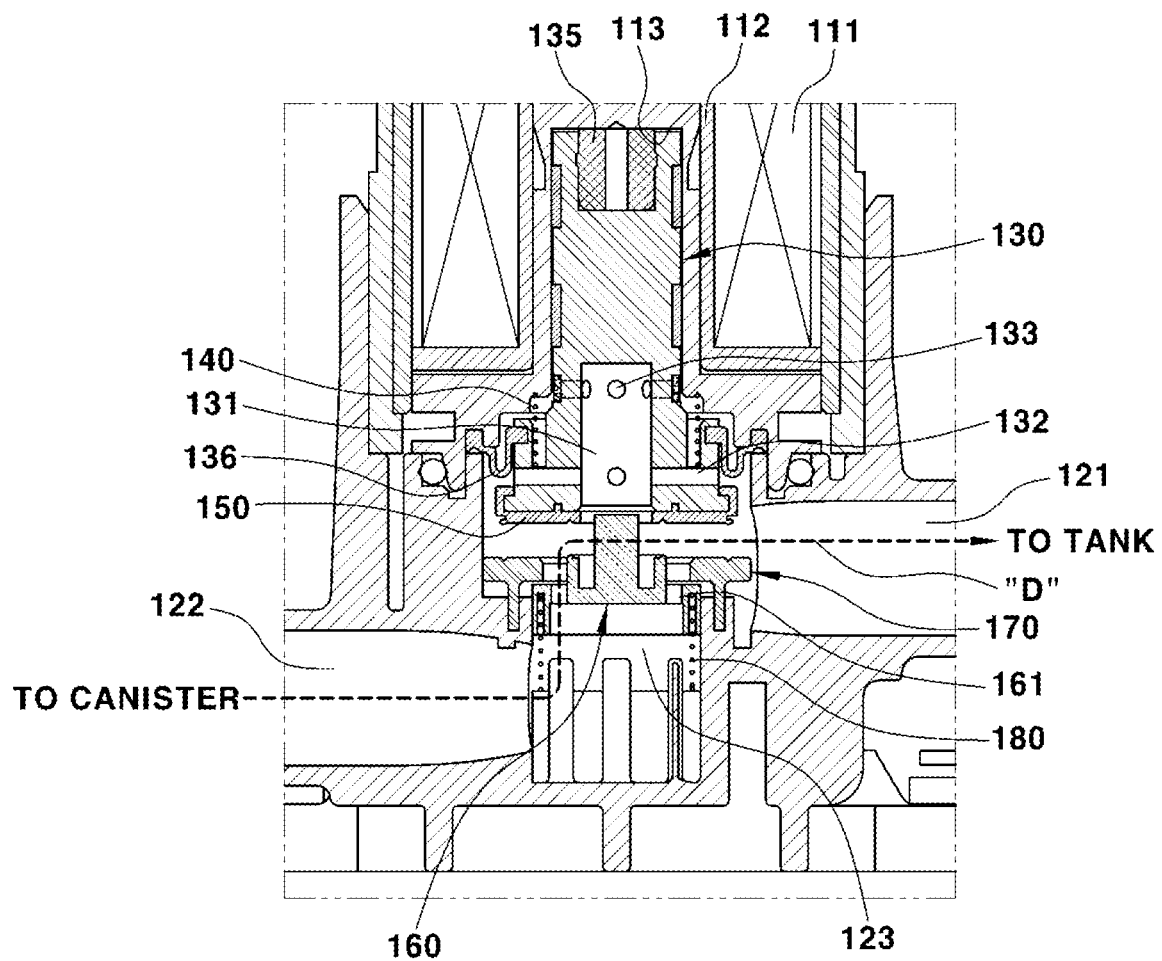
FIG. 11 is a cross-sectional view illustrating an operation of releasing over-negative pressure by the fuel tank isolation solenoid valve for a vehicle according to one form of the present disclosure.

FIG. 11 is a cross-sectional view illustrating an operation of releasing over-negative pressure using the fuel tank isolation solenoid valve for a vehicle according to the form of the present disclosure.

When the pressure in the fuel tank is decreased below the reference pressure, over-negative pressure acts on the second passage 122 from the canister on which the negative pressure of the engine acts.

The over-negative pressure in the second passage 122, which is transmitted from the canister, acts on the lower portion of the plunger 130 through the second vent holes 161 in the valve body 160.

Consequently, due to the over-negative pressure, the plunger 130 is raised while compressing the first spring 140, and the main seal 150 mounted on the plunger 130 is separated and spaced apart from the sealing plate 170, as illustrated in FIG. 11. Accordingly, the first passage 121 communicating with the fuel tank and the second passage 122 communicating with the canister communicate with each other via the second vent holes 161 in the valve body 160.

As a result, the over-negative pressure in the canister sequentially passes through the second passage 122 and the second vent holes 161 in the valve body 160, and then acts on the first passage 121 communicating with the fuel tank, whereby the over-negative pressure is easily released, as indicated by the arrow "D" in FIG. 11.

When the over-negative pressure is released as described above, the plunger 130 is lowered to the initial position thereof by the elastic restoring force of the first spring 140, and the main seal 150 mounted on the plunger 130 comes into airtight contact with the sealing plate 170 and the sealing wall 162, thereby closing the isolation solenoid valve 100.

Therefore, since overpressure (positive pressure) or over-negative pressure, which acts on the isolation solenoid valve 100, is easily released, it is possible to inhibit damage and malfunction of the internal components of the isolation solenoid valve, and it is possible to increase the durability of the fuel tank and the isolation solenoid valve.

Figure 1:
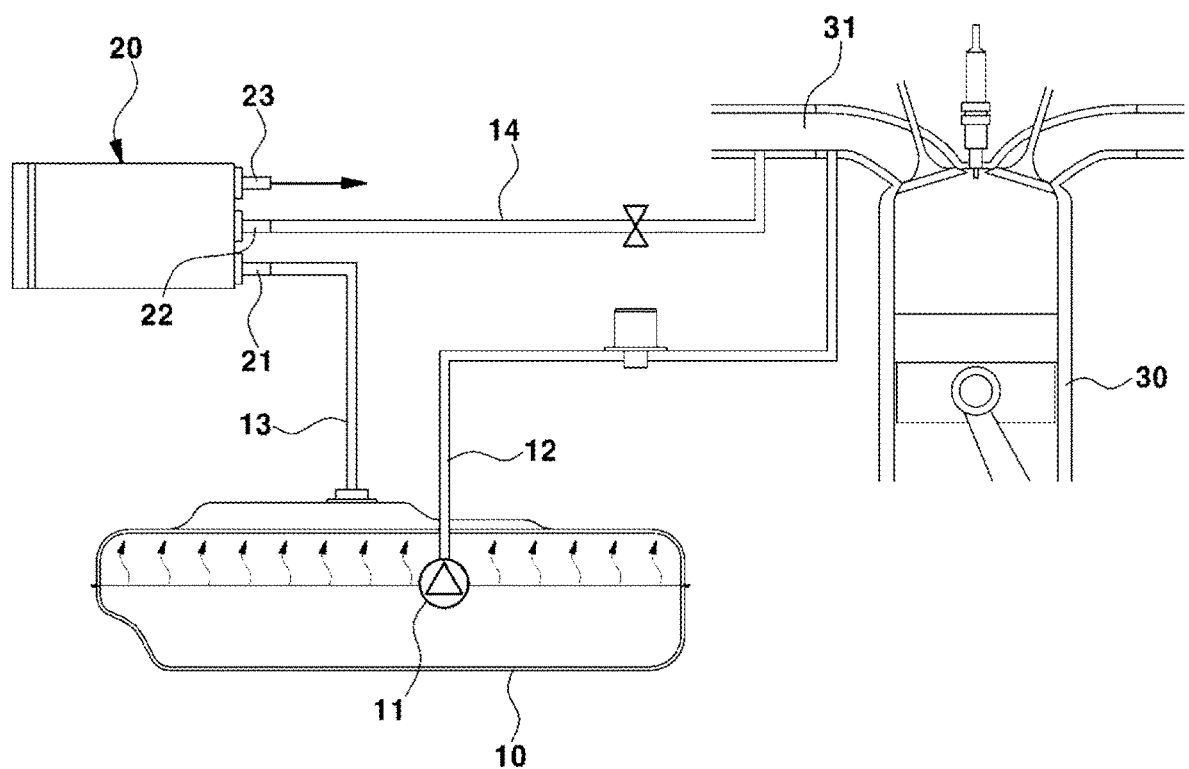
FIG. 1 is a schematic view illustrating a procedure in which the evaporation gas in a fuel tank is collected in a canister and is then purged to an engine.
Figure 2:
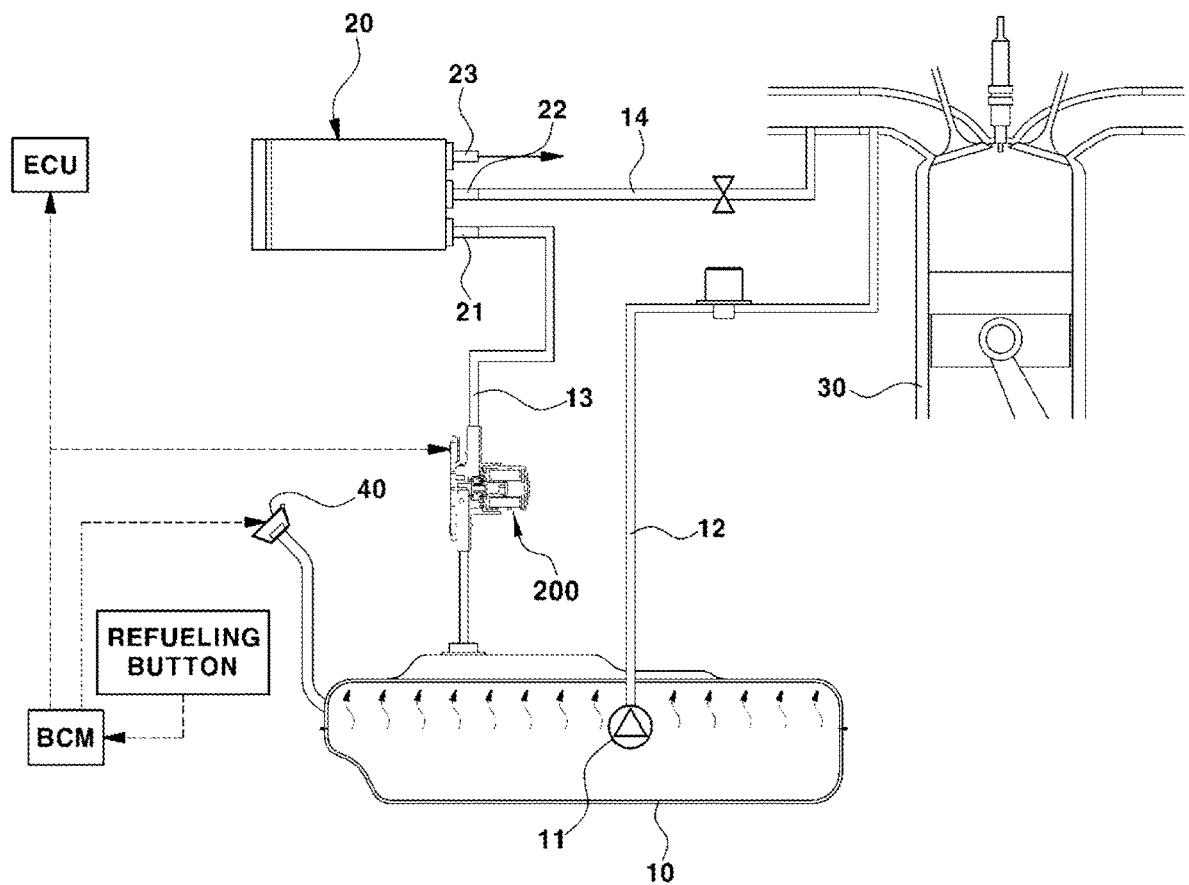
FIG. 2 is a schematic view illustrating a structure in which an isolation solenoid valve is provided between the fuel tank and the canister.
Figure 3:
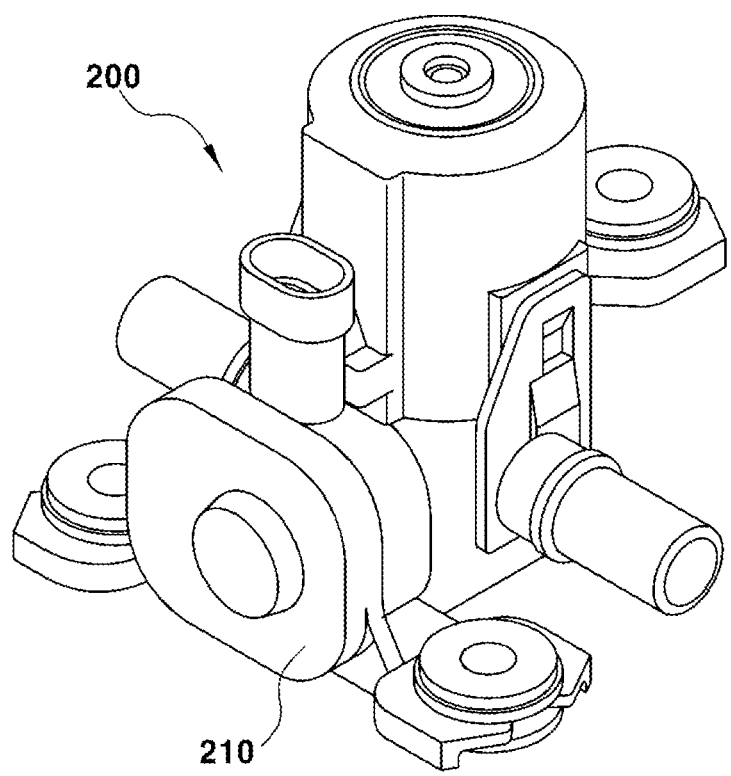
FIG. 3 is a perspective view illustrating the appearance of the conventional isolation solenoid valve equipped with a relief valve.

Comparing the conventional isolation solenoid valve 200 including the relief valve 210 shown in FIG. 3 with the isolation solenoid valve 100 according to the form of the present disclosure shown in FIG. 4, the size of the isolation solenoid valve 100 is reduced to be smaller than the size of the conventional isolation solenoid valve 200 because the relief valve is omitted from the isolation solenoid valve 100. Consequently, the isolation solenoid valve according to the present disclosure offers an advantage in the design of a package layout, in which it is desirable to mount the isolation solenoid valve to a vehicle body, and offers effects of a reduced number of component, cost savings and reduced weight by virtue of obviation of the relief valve.

By virtue of the above-described construction, the present disclosure offers the following effects.

First, when overpressure (positive pressure), which is a pressure higher than a reference pressure, acts on the isolation solenoid valve from the fuel tank, since the valve body in the isolation solenoid valve is lowered so as to define a path for releasing the overpressure, it is possible to easily release the overpressure.

Second, when overpressure (positive pressure) acts on the isolation solenoid valve from the canister, since the plunger in the isolation solenoid valve is raised so as to define a path for releasing the overpressure, it is possible to easily release the overpressure.

Third, since overpressure (positive pressure) and over-negative pressure acting on the isolation solenoid valve, are easily released, it is possible to inhibit malfunction of the isolation solenoid valve and to increase durability of the isolation solenoid valve.

Fourth, it is possible to ensure a function of inhibiting evaporated gas from being discharged to the atmosphere since the isolation solenoid valve is maintained in the closed state when the engine is not operated, a function of collecting the evaporated gas in the fuel tank into the canister and of purging the evaporated gas to the engine so as to be burned since the isolation solenoid valve is opened when the engine is operated, and a function of releasing the internal pressure in the fuel tank for refueling since the isolation solenoid valve is opened when the fuel tank is refueled.

Fifth, the isolation solenoid valve according to the present disclosure is able to reduce the overall size thereof, compared to a conventional isolation solenoid valve including a relief valve, and thus offers an advantage in the design of a package layout, in which it is desirable to mount the isolation solenoid valve to a vehicle body. Furthermore, it is possible to offer effects of a reduced number of components, cost savings and reduced weight by virtue of omission of the relief valve.

The present disclosure has been described in detail with reference to preferred forms thereof. However, it will be appreciated by those skilled in the art that changes may be made in these forms without departing from the principles and spirit of the present disclosure.

What is claimed is:

1. A fuel tank isolation solenoid valve for a vehicle, the fuel tank isolation solenoid valve comprising:
   an upper case;
   a bobbin mounted in the upper case;
   a coil wound around the bobbin;
   a core mounted in the bobbin, the core having therein a plunger passage that is open at a lower end thereof;
   a lower case coupled to the upper case, the lower case including:
      a first passage configured to communicate with a fuel tank,
      a second passage configured to communicate with a canister, and
      a communication passage defined between the first passage and the second passage;
   a plunger having a lower open space formed therein and a plurality of first vent holes configured to allow the first passage to communicate with the lower open space, the plunger being disposed in the plunger passage and configured to vertically move;
   a main seal mounted on a lower surface of the plunger;
   a valve body disposed in the communication passage to be vertically moved and having a plurality of second vent holes, wherein the plurality of second vent holes are vertically formed through the valve body and are configured to allow the first passage to communicate with the second passage;
   a sealing plate mounted on the lower case at an outer circumference of the communication passage so as to be in airtight contact with both a lower surface of the main seal and an upper surface of the valve body;
   a first spring disposed between a lower surface of the core and a lower end of the plunger; and
   a second spring disposed between a lower surface of the valve body and a bottom surface of the communication passage.

2. The fuel tank isolation solenoid valve of claim 1, further comprising: a diaphragm disposed between and connected to an outer surface of the plunger and an inner surface of the core.

3. The fuel tank isolation solenoid valve of claim 2, wherein the plunger further has a vent hole formed therein, the vent hole configured to allow an upper space in the diaphragm to communicate with the lower open space in the plunger.

4. The fuel tank isolation solenoid valve of claim 1, wherein the plunger has a first spring-holding groove formed in an outer circumference of a lower end thereof, the first spring configured to be fitted and held in the first spring-holding groove.

5. The fuel tank isolation solenoid valve of claim 1, wherein the plunger includes a stopper on an upper surface thereof, and the stopper is configured to contact with an upper end surface of the plunger passage formed in the core while buffering the upper end surface of the plunger.

6. The fuel tank isolation solenoid valve of claim 1, wherein the valve body includes a sealing wall projecting from an upper surface thereof at an inner circumference inwardly spaced apart from the second vent holes, the sealing wall configured to come into airtight close contact with the main seal.

7. The fuel tank isolation solenoid valve of claim 1, wherein the valve body includes a vertical guide pin formed at a center of the upper surface thereof, and the vertical guide pin is configured to enter and come out of the lower open space in the plunger.

8. The fuel tank isolation solenoid valve of claim 1, wherein the valve body has a second spring-holding groove formed in an outer circumference of the lower surface thereof, and the second spring is configured to be fitted and held in the second spring-holding groove.

9. The fuel tank isolation solenoid valve of claim 1, wherein the sealing plate includes a fitting wall formed on a lower surface thereof, and the lower case has a fitting groove formed in an outer circumference of the communication passage, the fitting wall configured to be fitted and held in the fitting groove.

10. The fuel tank isolation solenoid valve of claim 1, wherein: when an overpressure, which is a pressure higher than a reference pressure, acts on the valve body through the first passage and the first vent holes in the plunger from the fuel tank,
  the valve body is lowered while compressing the second spring,
  the overpressure sequentially passes through the first vent holes and the lower open space in the plunger and the second vent holes in the valve body, and acts on the second passage, and
  the overpressure is released.

11. The fuel tank isolation solenoid valve of claim 1, wherein: when an over-negative pressure, which is a pressure lower than a reference pressure, acts on a lower portion of the plunger through the second vent holes in the valve body from the canister,
  the plunger is raised while compressing the first spring,
  the over-negative pressure passes through the second vent holes in the valve body and acts on the first passage communicating with the fuel tank, and
  the over-negative pressure is released.

* * * * *